United States Patent
Chien (10) Patent No.: US 10,591,810 B2
(45) Date of Patent: Mar. 17, 2020

(54) LED PROJECTION LIGHT HAS MULTIPLE FUNCTIONS

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 15/685,701

(22) Filed: Aug. 24, 2017

(65) Prior Publication Data

US 2018/0067384 A1 Mar. 8, 2018

Related U.S. Application Data

(60) Continuation-in-part of application No. 14/968,250, filed on Dec. 14, 2015, which is a
(Continued)

(51) Int. Cl.
*G03B 21/14* (2006.01)
*F21S 8/00* (2006.01)
(Continued)

(52) U.S. Cl.
CPC ............ *G03B 21/142* (2013.01); *F21S 8/035* (2013.01); *F21S 8/038* (2013.01); *F21S 9/022* (2013.01); *F21S 10/002* (2013.01); *F21V 14/02* (2013.01); *F21V 21/08* (2013.01); *F21V 21/14* (2013.01); *F21V 23/04* (2013.01); *F21V 23/0457* (2013.01); *F21V 23/0464* (2013.01); *F21V 29/00* (2013.01); *G03B 21/2033* (2013.01); *G03B 21/53* (2013.01); *G03B 29/00* (2013.01);
(Continued)

(58) Field of Classification Search
CPC .... G03B 21/20; G03B 21/142; G03B 21/145; G03B 21/2013; G03B 21/2033; F21S 41/14; F21S 41/141; F21S 8/033; F21S 8/035
See application file for complete search history.

(56) References Cited

U.S. PATENT DOCUMENTS

| 4,285,028 A | 8/1981 | Sundin et al. |
| 5,321,449 A | 6/1994 | Coccoli et al. |

(Continued)

FOREIGN PATENT DOCUMENTS

EP 1411290 A1 4/2004

*Primary Examiner* — Sultan Chowdhury
(74) *Attorney, Agent, or Firm* — Bacon & Thomas, PLLC (57) ABSTRACT

The multiple function LED project light is a hand-held and powered by DC power, and the project light has front lens has project magnify lens fit-into or install-on or built-in on center position. The project lens has below position outer-tube set assembled together so outer-tube can envelope or surrounded the lower position separated inner-tube which has image-forming unit within. While the project head move away from the project light neck by screw-thread or other extend construction to make distance between the magnify lens and image forming-unit changed to get focus adjustment functions. The said Project light may has self-prong, or project light fit within the hold-base which has prong-set both get AC current through the AC-to-DC circuit to get desired DC power for LED or SMD-LEDs or Dip-LEDs or COB-LED or other DC operated electric components to use. The said project light at least have project image function and flashlight functions or-and other more different functions light select from market available types.

25 Claims, 8 Drawing Sheets

Related U.S. Application Data continuation-in-part of application No. 14/944,953, filed on Nov. 18, 2015, now Pat. No. 10,509,304, which is a continuation-in-part of application No. 12/886,832, filed on Sep. 21, 2010, application No. 15/685,701, which is a continuation-in-part of application No. 14/968,153, filed on Dec. 14, 2015, now Pat. No. 10,323,808, which is a continuation-in-part of application No. 14/737,434, filed on Jun. 11, 2015, now abandoned, which is a continuation-in-part of application No. 14/622,628, filed on Feb. 13, 2015, now Pat. No. 9,097,413, application No. 15/685,701, which is a continuation-in-part of application No. 14/943,645, filed on Nov. 17, 2015, which is a continuation-in-part of application No. 12/834,435, filed on Jul. 12, 2010, which is a division of application No. 12/292,253, filed on Nov. 14, 2008, now Pat. No. 7,671,318, application No. 15/685,701, which is a continuation-in-part of application No. 14/967,862, filed on Dec. 14, 2015, which is a continuation-in-part of application No. 14/539,267, filed on Nov. 12, 2014, which is a continuation-in-part of application No. 14/275,184, filed on May 12, 2014, now Pat. No. 10,371,330, which is a continuation-in-part of application No. 12/914,584, filed on Oct. 28, 2010, now Pat. No. 8,721,160, application No. 15/685,701, which is a continuation-in-part of application No. 14/728,369, filed on Jun. 2, 2015, now Pat. No. 9,787,885, which is a continuation-in-part of application No. 14/265,838, filed on Apr. 30, 2014, now Pat. No. 9,197,865, and a continuation-in-part of application No. 14/265,738, filed on Apr. 30, 2014, now Pat. No. 9,560,322, and a continuation-in-part of application No. 13/295,301, filed on Nov. 14, 2011, now Pat. No. 8,760,514.

(51) Int. Cl.

| | | |
|---|---|---|
| *F21V 23/04* | (2006.01) | |
| *G03B 21/20* | (2006.01) | |
| *F21S 9/02* | (2006.01) | |
| *F21V 21/14* | (2006.01) | |
| *G03B 21/53* | (2006.01) | |
| *H04N 9/31* | (2006.01) | |
| *G03B 29/00* | (2006.01) | |
| *F21S 10/00* | (2006.01) | |
| *F21V 21/08* | (2006.01) | |
| *F21V 29/00* | (2015.01) | |
| *F21V 14/02* | (2006.01) | |
| *F21Y 115/10* | (2016.01) | |
| *F21Y 101/00* | (2016.01) | |
| *F21Y 115/30* | (2016.01) | |
| *F21W 121/00* | (2006.01) | |
| *F21V 9/08* | (2018.01) | |
| *F21V 21/22* | (2006.01) | |
| *F21V 21/29* | (2006.01) | |
| *F21V 21/30* | (2006.01) | |

(52) U.S. Cl.
CPC ............ *H04N 9/315* (2013.01); *H04N 9/317* (2013.01); *H04N 9/3155* (2013.01); *H04N 9/3194* (2013.01); *F21V 9/08* (2013.01); *F21V 21/22* (2013.01); *F21V 21/29* (2013.01); *F21V 21/30* (2013.01); *F21V 23/0471* (2013.01); *F21V 23/0492* (2013.01); *F21W 2121/00* (2013.01); *F21Y 2101/00* (2013.01); *F21Y 2115/10* (2016.08); *F21Y 2115/30* (2016.08); *G03B 21/145* (2013.01); *Y10S 362/80* (2013.01)

(56) References Cited

U.S. PATENT DOCUMENTS

| | | |
|---|---|---|
| 5,324,224 A | 6/1994 | Anderson et al. |
| 5,517,264 A | 5/1996 | Sutton |
| 5,595,435 A | 1/1997 | Palmer et al. |
| 5,752,766 A | 5/1998 | Bailey et al. |
| 5,934,223 A | 8/1999 | Ellery-Guy |
| 6,431,719 B1 | 8/2002 | Lau et al. |
| 6,558,022 B2 | 5/2003 | Kawahara |
| 6,744,693 B2 | 6/2004 | Brockmann et al. |
| 7,104,656 B2 | 9/2006 | Dwyer |
| 7,267,444 B2 | 9/2007 | Black, Jr. |
| 7,478,912 B2 | 1/2009 | Black, Jr. |
| 7,717,570 B2 | 5/2010 | Black, Jr. |
| 7,832,917 B2 | 11/2010 | Chien |
| 7,871,192 B2 | 1/2011 | Chien |
| 8,083,377 B2 | 12/2011 | Chien |
| 8,128,274 B2 | 3/2012 | Chien |
| 8,297,756 B2 * | 10/2012 | Ouyang ................ F21V 14/06 353/101 |
| 8,303,150 B2 | 11/2012 | Chien |
| 8,408,736 B2 | 4/2013 | Chien |
| 8,879,782 B2 | 11/2014 | Garlington |
| 9,157,589 B2 | 10/2015 | Chien |
| 9,267,660 B1 | 2/2016 | Wang |
| 2005/0111213 A1 | 5/2005 | Smith |
| 2006/0146297 A1* | 7/2006 | Lee ..................... H04N 5/7458 353/99 |
| 2006/0227831 A1 | 10/2006 | Thuot Rann et al. |
| 2007/0027831 A1 | 2/2007 | Bucher et al. |
| 2007/0109813 A1 | 5/2007 | Copeland |
| 2008/0062685 A1 | 3/2008 | Belliveau et al. |
| 2011/0007496 A1 | 1/2011 | Chien |
| 2015/0276178 A1 | 10/2015 | Chien |
| 2016/0097499 A1 | 4/2016 | Chien |
| 2016/0097969 A1 | 4/2016 | Sum |
| 2016/0209013 A1 | 7/2016 | Chien |
| 2016/0313636 A1 | 10/2016 | Chien |

\* cited by examiner

LED PROJECTION LIGHT HAS MULTIPLE FUNCTIONS

This application is a continuation-in-part of U.S. patent application Ser. No. 14/958,250, filed Dec. 14, 2015, is a continuation-in-part of U.S. patent application Ser. No. 14/944,953, filed Nov. 8, 2015, which is a continuation-in-part of U.S. patent application Ser. No. 12/886,832, filed Sep. 21, 2010.

This application is also a continuation-in-part of U.S. patent application Ser. No. 14/968,153, filed Dec. 14, 2015, which is a continuation-in-part of U.S. patent application Ser. No. 14/737,434, filed Jun. 11, 2015, which is a continuation-in-part of U.S. patent application Ser. No. 14/622,628, filed Feb. 13, 2015, now U.S. Pat. No. 9,097,413.

This application is also a continuation-in-part of U.S. patent application Ser. No. 14/943,645, filed Nov. 28, 2015, which is a continuation-in-part of U.S. patent application Ser. No. 12/834,435, filed Jul. 12, 2010, which is a division of U.S. patent application Ser. No. 12/292,253, filed Nov. 12, 2008.

This application is also a continuation-in-part of U.S. patent application Ser. No. 14/967,862, filed Nov. 12, 2014, which is a continuation-in-part of U.S. patent application Ser. No. 14/275,184, filed May 12, 2014, which is a continuation-in-part of U.S. patent application Ser. No. 12/914,584, filed Oct. 28, 2010, now U.S. Pat. No. 8,721,160.

This application is also a continuation-in-part of U.S. patent application Ser. No. 14/728,369, filed Jun. 2, 2015, which is a continuation-in-part of U.S. patent application Ser. No. 14/265,838, filed Apr. 30, 2014, now U.S. Pat. No. 9,197,865, and U.S. patent application Ser. No. 14/265,738, filed Apr. 30, 2014, now U.S. Pat. No. 9,560,322, which are continuation-in-parts of U.S. patent Ser. No. 13/295,301, filed Nov. 14, 2011, now U.S. Pat. No. 8,760,514.

BACKGROUND OF THE INVENTION

A number of the inventor's copending patent applications and patents disclose the same simple and low-cost projection assembly to project images or lighted patterns with a desired focus and/or adjustable direction, angle, or position, and powered by an AC or DC or AC-to-DC power source. These applications include: (# II-2) U.S. Ser. No. 13/540,689 Filed on Jul. 3, 2012 now is U.S. Pat. No. 8,511,877 which is CIP of (# II-1) U.S. Ser. No. 13/534,611 Filed on Jan. 27, 2012 now is U.S. Pat. No. 8,714,799 which is CIP of (# II-2009) U.S. Ser. No. 12/624,621 filed on Nov. 24, 2009 now is U.S. Pat. No. 8,303,150.

The current invention also utilizes projection theory applied to an optics-lens as disclosed in (# FF-4) 14-967,862 filed on Nov. 23, 2016 which is CIP of (# FF-3) 14-539,267 filed on Nov. 23, 2016 which is CIP of (# FF-2) U.S. Ser. No. 14/275,184 filed on Nov. 23, 2016 which is CIP of (# FF-1) U.S. Ser. No. 12/914,160 now is U.S. Pat. No. 8,721,160. Those parent filing cases are mainly directed to applications of optics-lenses to form an image with simple optics assembly for plugging into an outlet or use as a desktop light with adjustable focus and/or angle and/or direction, and with desired brightness, color and other LED light performance.

The current invention also utilizes principles disclosed in: US (# KKK-3) U.S. Ser. No. 14/728,369 Filed on Jun. 2, 2015 now is allowanced is CIP of (# KKK-2) U.S. Ser. No. 14/265,838 filed on Apr. 30, 2014 now is U.S. Pat. No. 9,197,865 is CIP of (# KKK-1) U.S. Ser. No. 14/265,738 filed on Apr. 30, 2014 now is U.S. Pat. No. 9,560,322 is CIP of (KKK-2011) U.S. Ser. No. 14/265,738 filed on Nov. 15, 2011 now is U.S. Pat. No. 8,760,514 For the Flashlight has the center camera or digital video same as current LED projection light kits on center.

The market has some power fail lights which use conductive charger construction which have no efficiency and need tens of hours to charge a small capacity of rechargeable battery such as to charge 3.7 volt 200 ma need almost more than one day for less one hour for LED illumination, so this kind of no-efficiency inductive charger power fail light is been fade out from market place after cheating consumer for years. The inductive charger for power fail light has some of US patents including U.S. Pat. Nos. 9,203,259 and 9,231,421 and US 2014-004-2963 and US 2015-021-9375 and US 2014-008-4886. Also, these power fail light only had night light and Power fail light. Without the projection light or body glow light so it more use for crisis. The inductive charger light needs take over days to get 200 ma current into battery and the 200 ma current be charged inside battery only can turn on the power fail light for less than 2 hours which is non-efficiency and non-practical for power fail light which should much longer for people to use while power shut-down.

The current invention uses a (direct contact charge system) which almost instantly charges in few hours or even less than hours depending on the input currents from the power source and the circuit design. Also, the current invention has built-in projection light so can make the illumination on ceilings or upper walls or any desired surfaces for characters or cartoons for kids. It also has multiple selections from projection light and/or night light and/or power fail light and/or flashlight and/or body-glow light. All these multiple functions all power is from the same AC-to-DC expensive circuit so make 1 or 2 functions vs. 5-10 functions only the need add very low-cost of LEDs or COBs or chips or SMD LEDs so the current invention has more function but cost will be more reasonable for consumer with more practically functions.

Furthermore, The current invention had built-in projection light and the LED projection light is hand-carriable or hand-held-able item so it required to make all difference distance surface show the clear image, so the current invention also design the focus adjustable construction and add the project refractive or said magnify lens on center of the Flashlight lens so center will has project image functions plus the surrounding lens has LEDs, SMD LED, Dip LEDs or COB LED to fill into to make one front or top or sides had 2 functions which is totally different with all US prior arts but it is similar with co-inventor parent filing case (# KKK-2011) (# KKK-3) and all related Child filed case. It is appreciated that all above listed or discussed co-pending and/or parent filed cases all scope, drawing, text, detail description, claims should all fall within the current invention scope and claims and coverage. Any alternative, equal functions, replaceable skill or parts should also fall within this invention's scope and claims.

The current invention for LED projection light has a base plugged-into a wall outlet to install a detachable multiple functions LED projection light which has at least one project image function and preferred combination from other function(s) from (1) power fail light (2) night light (3) flashlight (4) Body glow (5) rechargeable energy unit (6) USB ports for supply power to other electric device and/or be charged by outlet power (7) surge and/or over-heat and/or warning system.

The said base has built-in magnetic unit or apply copending universal magnetic sealed-unit which not only can supply the magnetic force to attach the metal ring(s) or piece(s) on the said detachable LED projection light but also can supply electric signal and/or current to said LED light. The said LED projection light has desired plurality of switch and/or sensor to make desired functions for turn on, turn off, selection, color changing, brightness, dimmable or other light performance.

The current invention makes a big improvement for marketing simple functions Night light or flashlight or power fail light or motion sensor night light because all the light source is LED and/or LEDs and/or Chip-On-Board (COB) and/or plurality of LED-units all need to use the AC-to-DC or DC-to-DC circuit which are majority cost for each light. The current to use the same AC-to-DC for plug-in products or DC-to-DC circuit for all battery or energy storage products to combine at least one of the projection light as above listed parent filed case (# DD) (# TT) (# FF) Family filed cases with the other added functions so can make one LED projection light has multiple function but the cost only limited increase for market so cheap LED-unit, or LEDs, Or COBs to bring consumer more function in one unit to let all ages people can have different purpose including (a) kids can have projection light, and/or (b) Adult may change project to camera and/or digital video, and/or (c) adult can have flashlight, and/or (d) All ages for power fail light and/or night light, and/or (e) House ladies night light, and/or (f) Man for power failure light, man for flashlight with camera to take all photos or video for situations.

So, the current invention is cost saving and offer many built-in expected or practically more than one functions for people comfortable and safety life.

It is appreciated all the above discussion or list for co-pending or co-inventor parent filing cases' drawing or description all still fall within the current invention scope and all the alternative or equal functions or replacement for the drawing or skill also should be cover by current invention spirit and coverage and claims.

DETAILED DESCRIPTION OF THE PREFERRED EMBODIMENTS

Figure 1:
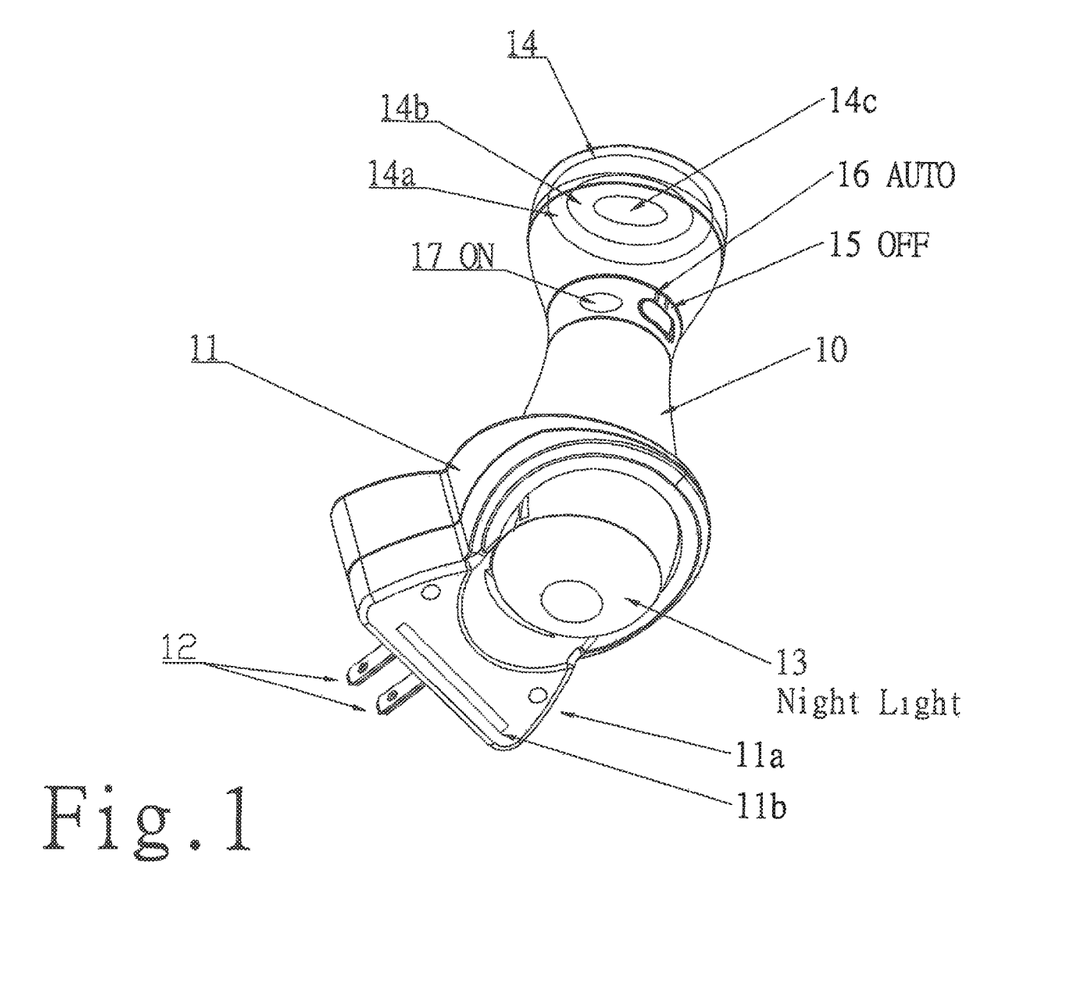
FIG. 1 illustrates the first embodiment for LED projection light has multiple functions Detail description has a plug-in base or built-in prongs to connect with AC power source.

The current LED projection light has multiple functions as FIG. 1 disclosure the overall design for a optional hold-base (12) has O-Ring shape holder (11) to hold or install the LED projection light (10) which has night light (13) on bottom and/or whole-body glows and/or top or front has projection light on center of the said Flashlight or power fail light. This is total has (a) a projection light on center of head or front of top end, and (b) a Power fail and/or flashlight arranged surrounding the center projection light on top or front of end of head, and (c) a glow light to make whole body glow up and front can have silkscreen of laser printing or printed piece to show out the lighted arts, and (d) a night light or multiple functions LED light on the bottom or base or rear of the said LED projection light, so the current invention to apply the expensive AC-to-DC circuit and get the said DC current to drive more than one areas LEDs or LED's chips or COBs (Chip-on-Board) for different parts or areas or section of the LED projection light for predetermined brightness, color, duration, functions, light show, on-off which available from all convention market for all LED light show.

From FIG. 1 the said LED projection light has almost everywhere can be illuminated basing on the multiple switch including (Switch 15) AUTO switch which can turn on the night light and/or projection light and/or glow body light under lower environment brightness such as 3 Lux, and while environment become brighter around 15 Lux to turn off one or any combination or all these light under predetermined time period, functions, or change light function from the night light to power fail light while power fail. The switch 15 may incorporate with another sensor such as photo sensor so can judge for environment brightness at 3 Lux or 15 lux.

From FIG. 1 disclosure the $2^{nd}$ switch (Switch 16) OFF switch which can turn off all the light for NO functions at any time.

From FIG. 1 disclosure the $3^{rd}$ switch (Switch 17) ON/SELECT switch which is turn on one or selected one or all lights of multiple pre-designed light functions to turn on. It can be a silicone conductive rubber switch or other conductive metal switch with cover to push the under PCB which has built-in IC chip so each touch or contact will change function from one to other one. The market place at least has 8 or 16 functions or any number of functions from select (1) which light turn on and/or
(2) which functions needed and/or
(3) which color needed and/or
(4) automatically to change color and/or
(5) which brightness needed similar or even continuously dimmer and/or
(6) the other functions available from market place.

So, the LED projection light has a desired number of switches to allow the consumer to make by themselves preferred functions from multiple functions in one product, which is much better than one product that only has a night light and power fail light.

From FIG. 1 show the optional hold-base which can have built-in AC-to-DC circuit and controller to get DC current and has the DC current output-terminals or ends or contactors to make electric connection with the metal-piece or magnetic-unit or universal magnetic sealed units so can make easily current or electric signal delivery from 120 Volt home electricity change to DC current and use DC current to input to the LED projection light. The more details and description show on FIG. 8 and FIG. 8A for following discussion.

Figure 2:
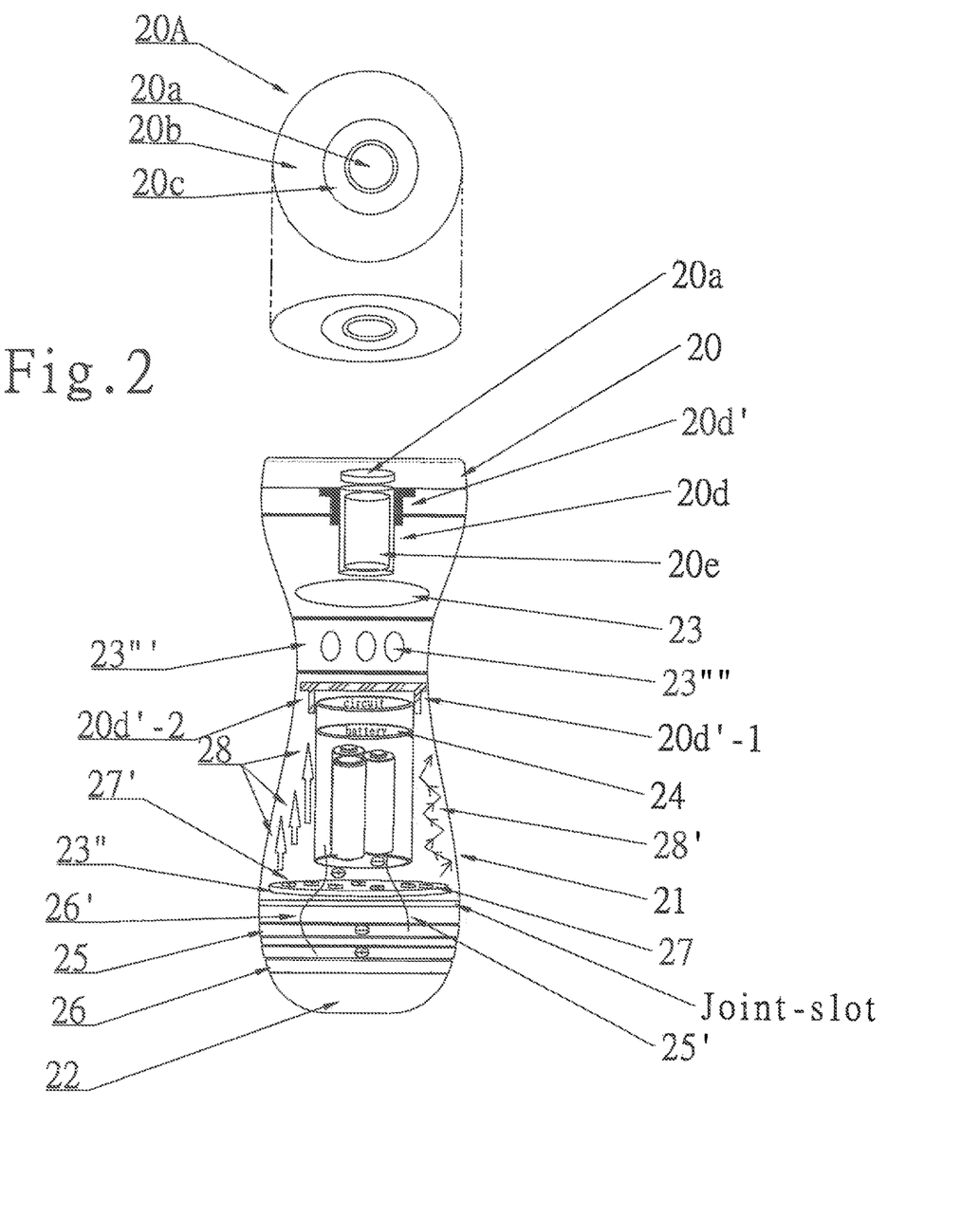
FIG. 2 illustrates the LED projection light more details for preferred multiple functions has light traveling for body glow and poles ring to make quickly contact charge from base and extendable or movable project-lens to make focus adjustment and multiple IC contact switch to selected desired function from plurality choice.

FIG. 2 illustrates the preferred construction of LED projection light (20) which may have functions or a light type that are changed or added or reduced but it should still fall within the current invention which has minimum has (AA) projection light on center and surrounding of the LEDs unit or COB or SMD or Dip LEDs, and (BB) rechargeable battery inside so can easily charge inner battery or energy storage unit from many other way. The more details discussion shows on the Following FIG. 5 for self-built-in Prong, and/or FIG. 8 for hold-base has prong, and/or FIG. 8A for outside transformer, solar module or generator or chemical power or USB power bank through the said connector/adaptor/plug insert into receiving end/socket/port build-in hold-base or the said LED projection light housing.

From FIG. 2 disclosure a LED projection light (20) has body (21) which has built-in rechargeable battery (24) has positive pole (+) and negative pole (−) to connect with the said rings (25) (26) both is metal or conductive material can delivery electric current or signal. The Ring (25) connect with Negative pole (−) and the Ring (26) is connect with positive pole (+) by conductive wire or piece to build the current delivery. For this preferred embodiment, the two of ring is 360 degree Can contact the charger circuit's positive and negative pole so can charge the housing (21) inner rechargeable battery (24).

The said inside housing (21) has other preferred or optional other Circuit such as (23") which has a desired number of LEDs or SMD LEDs or Dip LEDS or COB LEDs (27) (27') so can make the whole body (21) for body glow. The Body (21) outside surface can has silkscreen printing or laser printing or wrap around by printed piece with art or cartoon or geometric arts so while the inner LEDs (27) (27') arrange on a circle and emit light toward to upper like the path straight (28) or multiple reflective and refractive path (28') will make the whole body glow like a back light performance and show out the added printing, logo, art, cartoon, character, image show out on the body.

The said bottom of the housing (21) has built-in (22) (See FIG. 2) or screw in or snap-in or physical push into or screw-in night light (22). The current one of preferred is screw-in type night light (See FIG. 7A) use thread (72a) (72a') to screw into and fit on the bottom of body so can easily to design the circuit which may be connect and get power from the body's internal battery (24); or bottom night light can get power from the self-battery-assembly same as FIG. 7A self-power-assembly (78') which can be 3 or 4 pieces of LR44 or bottom batteries with its own switch system (not shown) and circuit with IC chips (72') with quickly flashing/steady on/random/chasing/sequential or other LEDs light functions to get super long burn time if well control the duty cycles and each on-time vs. Off-time to get max hundred to thousand hours depend on how to design; and the LED may selected SMD type (77a) or Dip (77b) or COB (77c).

From FIG. 2 can see the top of body (21) has other preferred or optional circuit (23') and (23). The circuit (23) is reinforce and it is optional to help the bottom circuit (23") if the LEDs on circuit (23") is not bright enough, so the Top circuit (23') can also has multiple LEDs or COB LED to face down to increase the brightness of the lower circuit (23"). Same time the circuit (23') also can install the IC for multiple or plurality of switch (23''') (23'''') so can get multiple functions as the above discussed on FIG. 1. The circuit (23') can install not only LEDs face down but also can install switch PCB so can let outside preferred silicone conductive switch can continuously contact with PCB to make function changed or functions selection. This is very traditional for the Circuit (23') has one or more PCBs for each of switch for (AUTO) (OFF) (ON) as above discussed on FIG. 1.

From FIG. 2 can see the top head (20) or front part of LED projection light has center project magnify assembly including the magnify lens (20a) and surrounding by the plurality of LEDs or SMD LED or COB (Chip-on-Board) LED (20c). The magnify lens (20a) is fit into or sonic-into or assembly-into the flashlight lens (20b) center. The magnify lens (20a) is fit with big-cross-section-area outer-tube or bigger Size of diameter outer tube (20d) and can surround the small-cross-section-area inner-tube or smaller diameter inner tube (20e) while the head (20) is move away from the body. This kind of magnify-lens (20a) can move away or close the body (21) can change the magnify lens (20a) distance with the slide or film or display forming piece inside the smaller diameter inner tube, so can make focus adjustable basing on the FIG. 10 and FIG. 11 and FIG. 12 which shown on the parent filed case and/or co-pending (# FF) U.S. Ser. No. 12/914,584 Filed on Oct. 28, 2010 Now is U.S. Pat. No. 8,721,160 which is Division of U.S. Ser. No. 12/318,470 filed on Dec. 30, 2008.

It is appreciated all above listed or discussed of all the Parent filed or Co-pending filed case all drawing, claims, description with all alternative or replaceable or equal functions should still consider fall within the current invention scope, spirit, claims.

From the Parent or co-pending filed case (# FF) U.S. Ser. No. 12/914,584 and U.S. Ser. No. 12/318,470 both has the clear project tube with film fit within which is same as current invention for small diameter or smaller-cross-section-area inner tube. The current invention just has moved the top magnify or said refractive lens fit into center of the flashlight lens and magnify lens has its own Bigger diameter or bigger-cross-section-area outer tube to envelope or surround or wrap around the small diameter or smaller-cross-section-areas inner tube (Same as all parent filed case for tube). So this is easily to know the said bigger diameter or bigger-cross-section-areas outer-tube just is added length to prevent from LED light beam leakage out to reduce the image projected brightness while the magnify-lens (20a) is away from original close position to image forming-unit to away position for focus adjustment.

Figure 3:
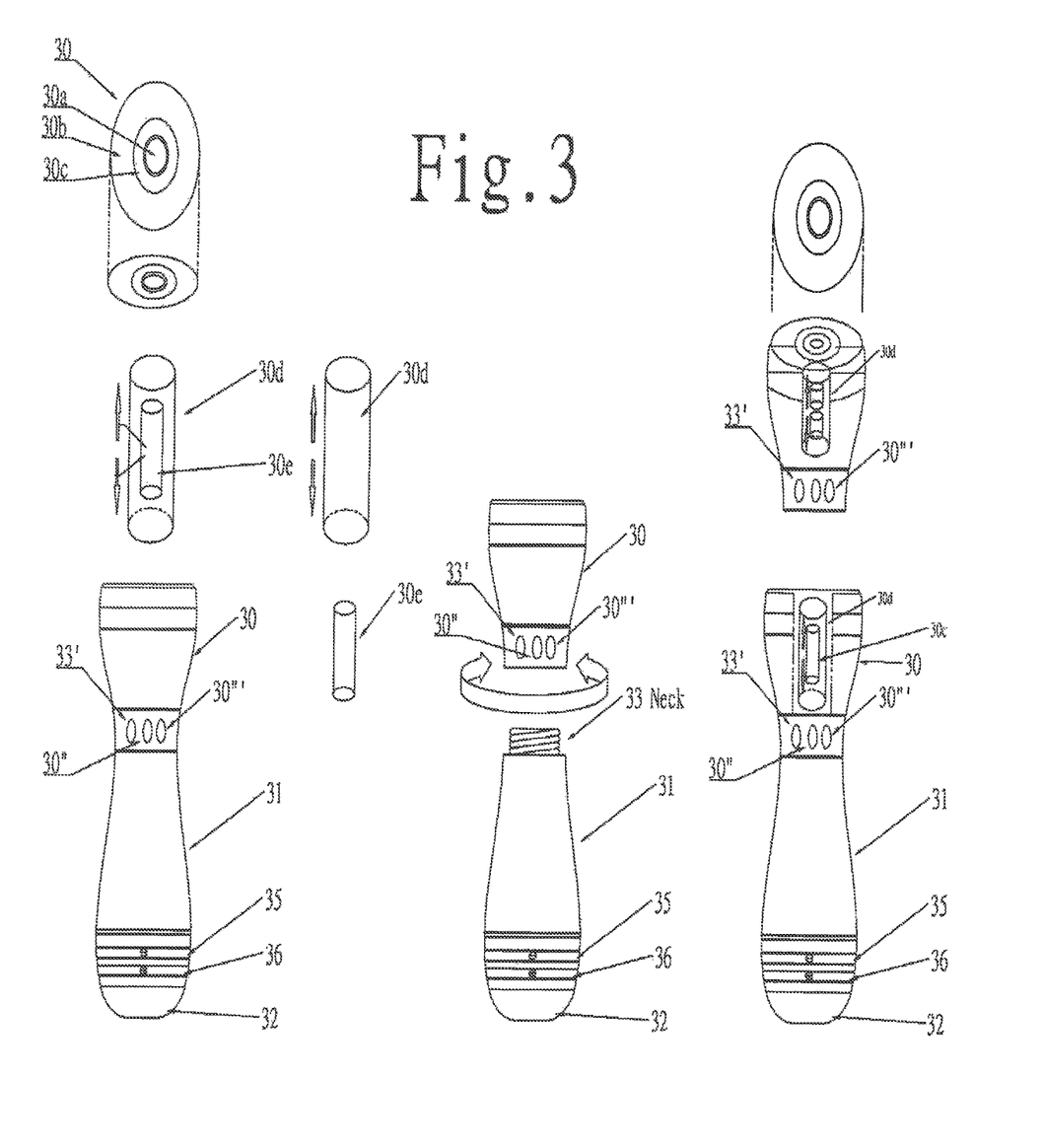
FIG. 3 illustrates the LED projection light how to make extendable and retractable the project assembly to make the focus adjustment and top lens arrangement for project head and flashlight light source(s) and project tube assembly with rechargeable conductive rings for accurate rechargeable from the base built-in magnetic and electric signal or current delivery to LED projection light.

From FIG. 2 and FIG. 3 disclosure the project magnify-lens is fit or assembly or install on the center of the projection light front or top lens. It means the magnify-lens is a separated unit. However, for the simple installation or reduce assembly procedure, the magnify-lens on the center of front or top lens of projection light can be made by injection process. It only needs to design tooling to combine both the (1) front or top projection light lens and (2)

magnify-lens for one-piece tooling so one can simply inject one time to get two kinds of optical lens with a one-time injection.

Or even can combine more optical-properties lens for (a) Projection image and/or lighted-patterns lens, and/or (b) flashlight convex or concave lens, and/or (c) surrounding LEDs or COB-unit(s) for special effects, and/or (d) Even to add laser or hologram treated film or lens in front of the laser light source while the projection light device also has built-in laser light source like parent filing above list (# TT-2) U.S. Ser. No. 14-968.250 which is CIP of (# TT-1) U.S. Ser. No. 14/944,953 filed on Dec. 14, 2015 which is CIP of (# TT-2010) U.S. Ser. No. 12/866,832 filed on Sep. 21, 2010 All these parents filed case has built-in Laser-and/or-LED light source. Here did not discuss for hand-held laser related items because too risk for kids use.

From FIG. 3 Top Left corner disclosure the more detail for how to make inner tube (30e) and outer tube (30d) from shortest length as top left corner show related to the project magnify lens (30a) on the center of the Flashlight lens (30b). The outer tube (30d) is assembled together with magnify or refractive lens (30b) so the both is move close or away from the inner tube (30e) always together to prevent from LED light beam leakage out.

From FIG. 3 top right corner show the said outer tube (30d) is totally envelope the inner tube (30e) inside while the flashlight top head (30) is not extended or not move away from the body (31).

From FIG. 3 Lower half center one show the one of preferred extend or move away the flashlight head (30) away from the body (31). The body 921) has neck part (333) which is smaller diameter or cross-section-area than the top flashlight head (30) so the top head can fit into the neck (333) and neck (333) has desired screw tread (longer and much more threads) or other thread (shorter and less number) so can make quickly move the flashlight head (30) to away or back to shortest position to make focus adjustment. The others switch and ring for recharge or delivery electric current already discussed on top and following FIG. 7 and FIG. 7A.

Figure 4:
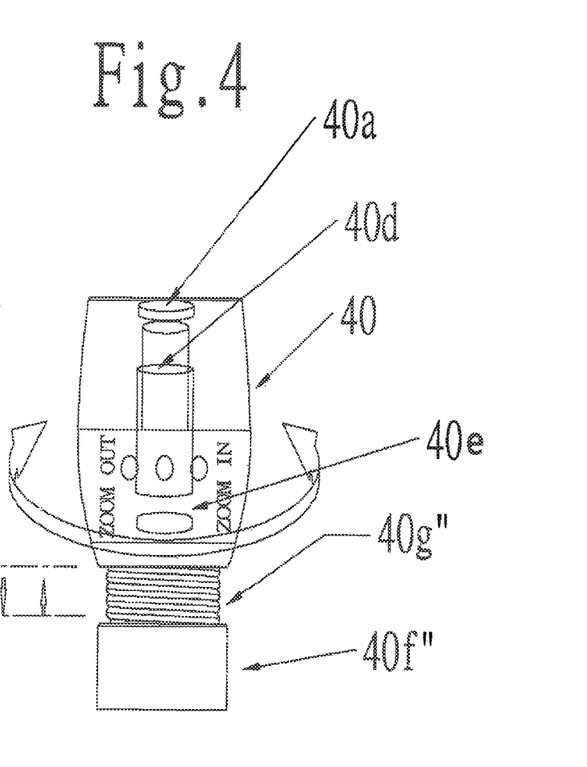
FIG. 4 and FIG. 4A illustrate the details and comparison for extendable and retractable head of the LED projectable light unit so can make the focus adjustment to get nice and clear image or take a photos and/or digital video with optional sound as market requirement.
Figure 4A:
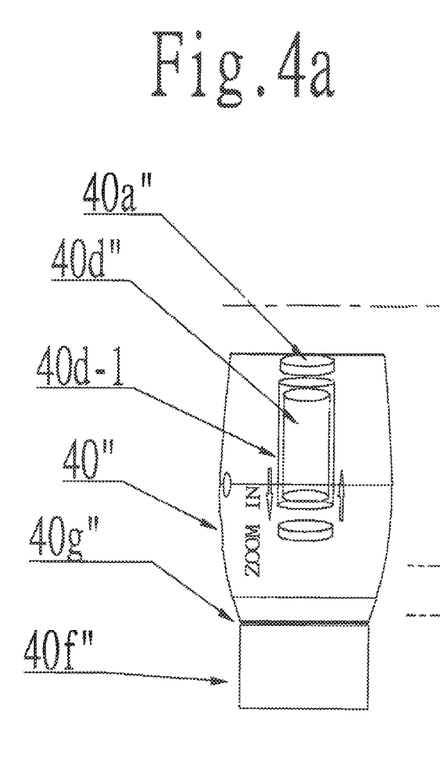

From FIG. 4 disclosure the LED projection light head (40) which also is flashlight head (40) that has project magnify lens on center of the flashlight lens as above discussed. The FIG. 4 show the inner tube is one piece with bigger diameter (if while tube is on round or cylinder type, but not limited for current invention). FIG. 4A shows the bigger outer or smaller inner tube are not single tube which may consist of multiple sections, tubes like telescope from one piece can use more than one sections/tubes with different diameter to get desired longer length, so this FIG. 4A can get longer outer tube if made by more than one of the tube to form the said outer tube-assembly.

From FIG. 4 disclosure the LED projection light head (40) has the Film or slide or image-forming-unit (40e) install on pre-determined position and while the outer tube (40d) is away from film or slide or forming-unit (40e) like FIG. 4 which has longer distance between magnify lens (40a') and forming-unit (40e) than the FIG. 4A magnify lens (40a") and forming-unit (40e") . . . because the head of the LED projection light (40) is extended by screw-thread (444') on the Neck (444) to extend away from the body top border (40g) (40g").

Figure 5:
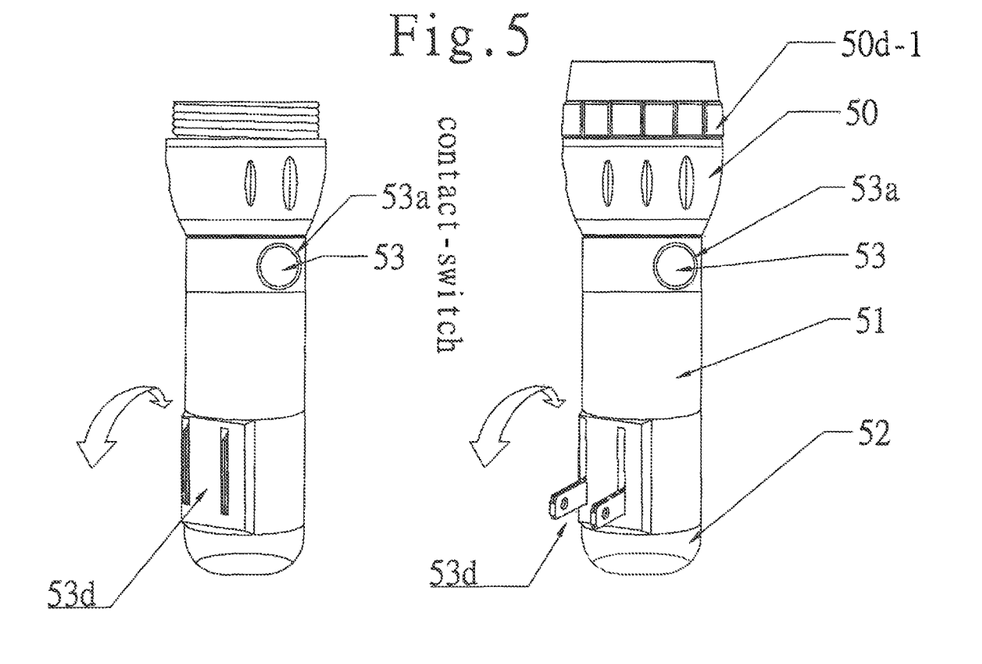
FIG. 5 illustrates the main parts for $2^{nd}$ embodiment of LED projection light.

From FIG. 5 disclosure multiple function LED projection light has the lens cover (50b-1) and adjust focus top head (50) and Glow Body (51) and end light (52) with a multiple selection switch (53) and the built-in prong set to directly plug-into outlet on wall or power strips or extension-cord or where ever had outlet receipts or socket or ports. From FIG. 5 shown top light the prong set is extend out and low light the prong-set is fold into the light body. This is one of the Alternative designs and application which has no hold-base so unit is much lower cost, less weight or less torque for prong sets into outlet (so can present from fall apart). The build-in prong-set can directly charge the inner battery or energy storage units for no any contact metal piece from hold-base to projection light unit to save a lot cost too. This application for LED projection light also can have built-in all kind of receptacles, socket, outlets for plug, USB ports for USB plug of wire set, adaptor for outside transformer or outside solar module to offer the AC and/or DC current to supply power to outside electric device or charger the projection light inner battery.

Figure 5A:
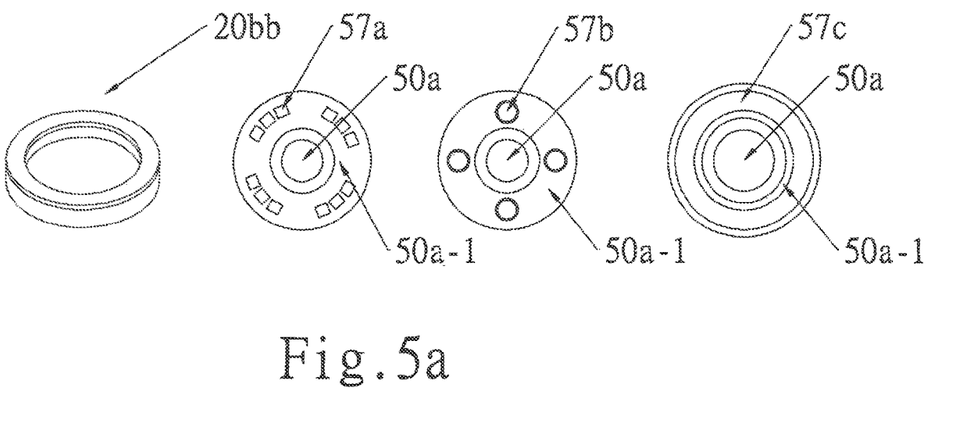
FIG. 5A illustrates the details possibility assembly for head of the LED projection light.

From FIG. 5A show a preferred arrangement in which a projection magnifying or refractive lens is installed or fitted or snapped into the flashlight lens. One way of fitting is to use rubber ring (50a-1) to hold the magnify lens (50a) on the flashlight lens. The parent and co-pending filed cases use the same skill for install the camera or digital video lens on center of the flashlight as (# KKK-3) U.S. Ser. No. 14/728,369 Filed on Jun. 2, 2015 which is CIP of (KKK-2011) U.S. Ser. No. 13/295,301 Filed on Nov. 14, 2011. All has optics lens install on center of Flashlight lens construction. The parent filing is for camera or digital video lens and the current invention is for the multiple function LED projection light. But all is same concept and spirit and construction, so it is appreciated all the above or below or follow listed or discussion for any concept, drawing, Figure, text, claims should all belong to the same invention and should be fall within the current claims and coverage.

From FIG. 5A also show the SMD LED (57a) and Dip LED (57b) and COB LED (57c) surrounding the center project optics-lens (50a) to make 2 functions in one flashlight lens which is the most important invention for current invention.

Figure 6:
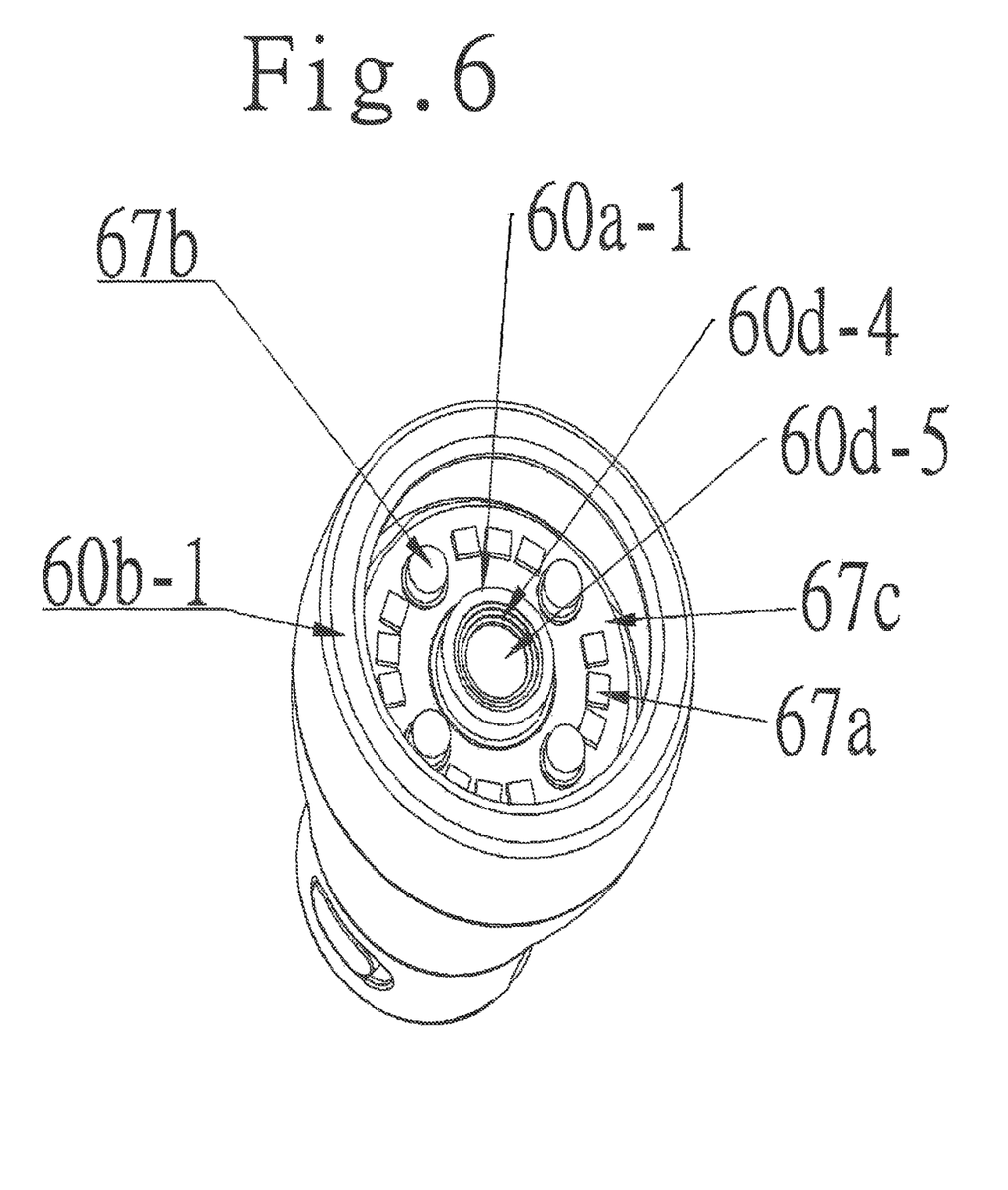
FIG. 6 illustrates the other arrangement for head of LED projection light with preferred LED or LEDs in SMD-LED and/or Dip-LED or Chip-on-board (COB) LEDs arrangement.

From FIG. 6 disclosure same details with FIG. 5 and FIG. 5A only for 2D drawing. The projection light head has center project magnify or refractive lens (60d) is fixed by snap-together with flashlight lens. The center project-lens (60d) is surrounded by the one or more LEDs may select from SMD LED (67a) or Dip LEDs (67b) or COB LED (67c). An alternative or equivalent arrangement to simplify assembly of the center magnify lens with the front-lens is to just combine both different optic-properties lens into one injection tooling so only need one-time injection process can get both the center project magnify-lens together with other parts for flashlight or power fail light lens. However this need to accurate design tooling as quality requirement.

Figures 7, 7A:
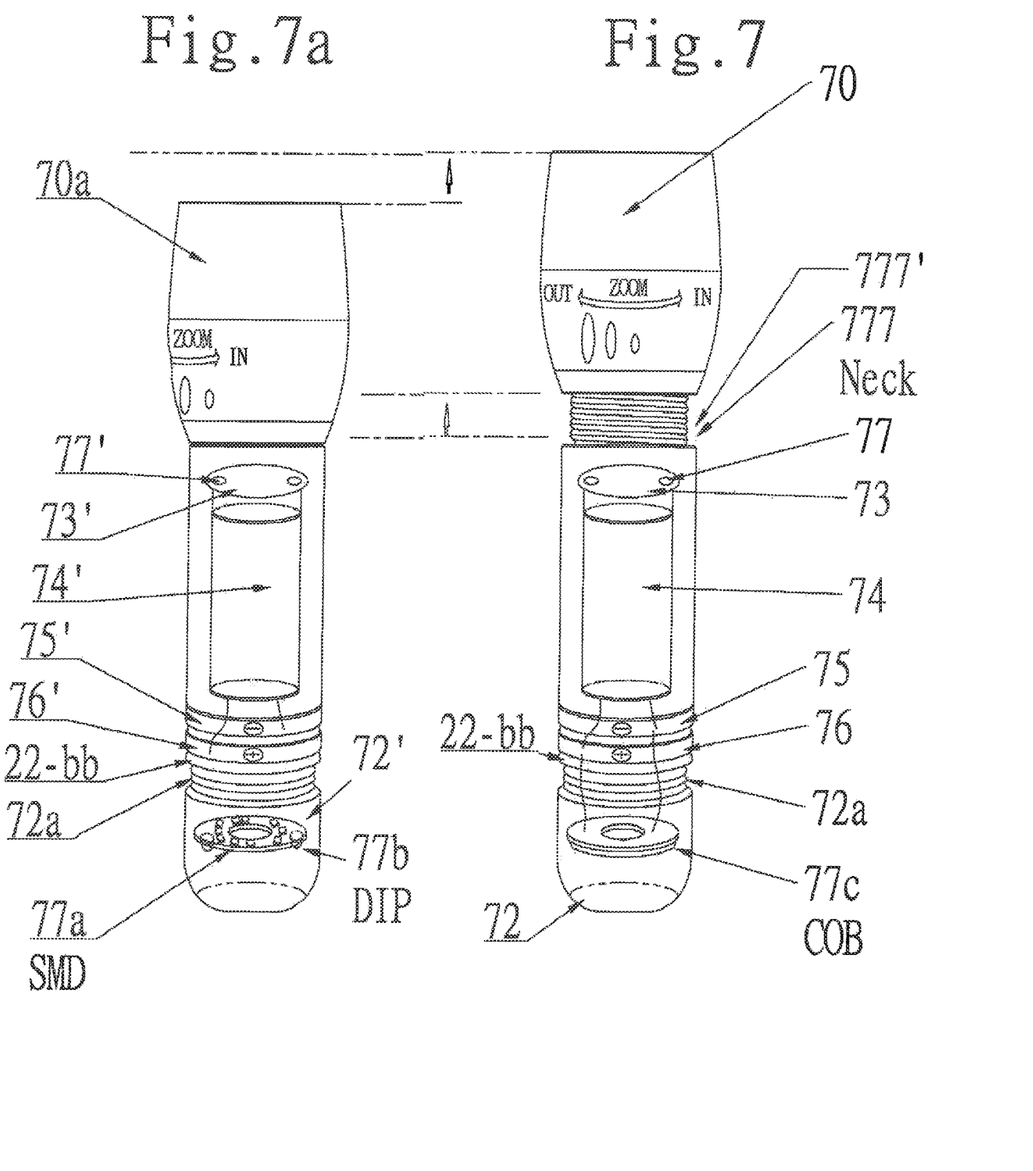
FIGS. 7 and 7A illustrates the one of preferred third embodiment which has major parts details to show charging rings, PCB(s), Circuit(s), head and/or bottom construction.

From FIG. 7 and FIG. 7A disclosure multiple function LED projection light (70) has the top head can move away from the body neck (777) by preferred screw tread (777') for quickly move head away and back to make the project magnify lens change position against the image forming-unit so can change focus. The projection light has built-in battery (74) and connect with top Circuit (73) PCB for IC control the multiple selection switch and functions controller and projection light source. The battery (74) also connect with at least two of contact rings (75) (76) to get the power from the outside power source's contact-piece(s) poles (+) (−) so can rechargeable the inner battery (74). The bottom of the projection light has night light or other LED light device which can use the projection light battery (74) or use FIG. 7A self-power source (78') to make the said SMD LED (77a), Dip LED (77b), or COB LED (77c) for desired or programmed or pre-determined functions with selected switch type on body or build-in bottom LED device. The said Bottom LED device can use screw-tread or snap-tight or sonic-sealing or clip-on or other assembled skill to install on the body of the said LED projection light body. Also, from the FIG. 7 the head of projection light is move away from the neck (777) and from FIG. 7A the head of projection light is not move away from the neck (777).

Figure 8:
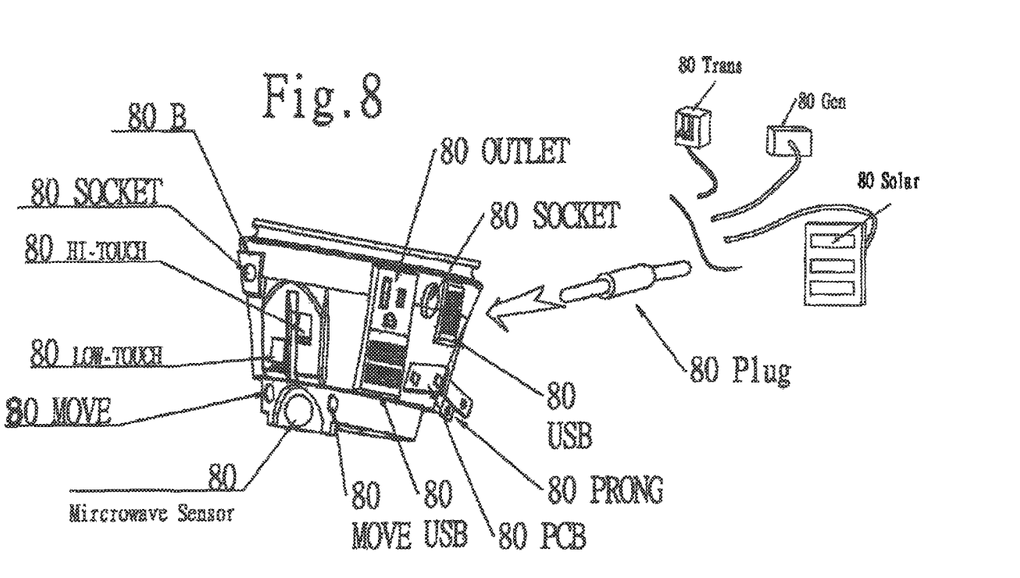
FIGS. 8 and 8A illustrate the one of holder base which has built-in prongs and circuitry with desired sensor(s) including motion, moving, photos or other sensor systems with built-in magnetic units(s) on hi-and-low position to make magnetic contact with LED projection light's conductive metal ring and also delivery electric signal including current to from the hi-and-low conductive metal piece with movable magnetic pieces as co-pending parent filing case "Universal Magnetic sealed-unit" discourse all features and details.

From the FIG. 8 can see the hold-base has built-in prong which get AC outlet power to the base. The hold-base may have preferred other receptacles or receiving-end or ports and/or sensors selected from the group that includes (1) USB port (80USB), and/or (2) outlet receptacle (80 outlet), and/or (3) adaptor (800 socket) or socket to receive the outside transformer or solar module or generator or chemical power or wind power source, and/or (4) motion and/or moving sensors set and/or photos sensor set.

The hold-base (80B) has at least two contact-piece (80h-toch) (80L-toch) which delivery the electric current or signal to the project LED light Which can be for two (a) elastic contact piece, or (b) push-contact piece, or (c) built-in by tooled designed compartment for load magnetic piece, or (d) use attachment skill to install added-on universal magnetic sealed-unit(s) (80h-toch) (80L-toch).

The said universal magnetic sealed-unit for added-on the inner or from the outside of product which is same as co-pending filing on Aug. 23, 2017 which is added-on or install-on individual units has magnetic on hi (80h-toch) and low position of the hold-base to make magnetic contact with the projection light hi and low 2 conductive-rings to make attachment, detachment, movable and electric current or signal delivery to charge the said inner battery of the projection light.

From The FIG. 8 also show the hold-base (80B) has the circuit (80PCB) which can transfer the 120 Volt AC current get from Prong-set and use AC-to-DC circuit to change to desired DC power source to supply the desired DC power to the said (1) USB port to supply DC power to other electric device by USB plug of USB wire, or (2) Supply the DC current to the said any DC operated parts and accessories such as IC, Motion sensor, moving sensor sets, build-in magnetic contactor, or added-on universal magnetic sealed-unit(s), or (3) electric signal transmitter or receiver, or (4) Camera or Digital video equipment while the hold-base has these any other more functions.

Figure 8A:
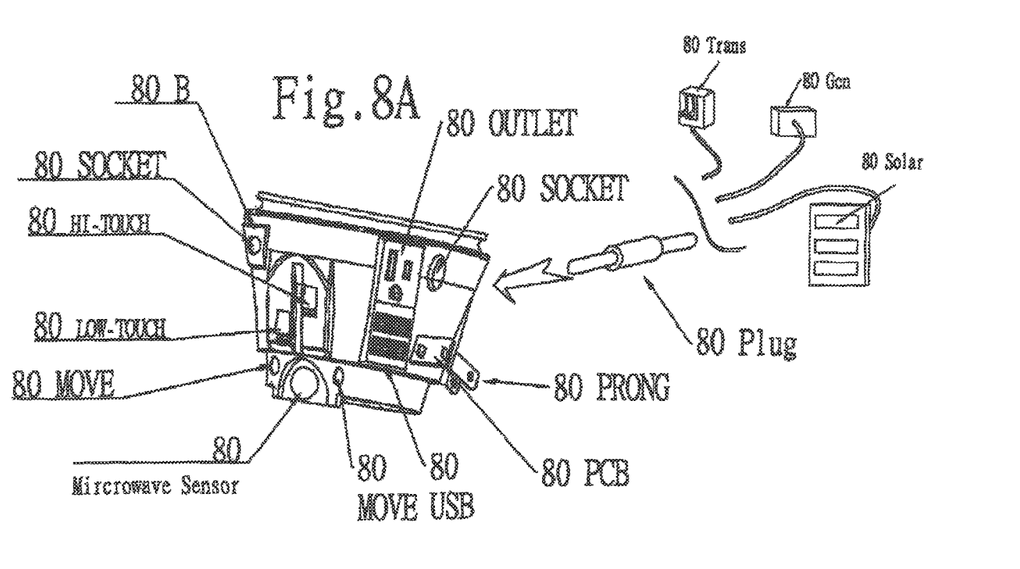

From FIG. 8A show the hold-base is a DC type hold device which is powered by the built-in Battery and/or outside power source and get into through the said adaptor or connector or socket (90 socket) which received the male plug for (a) outside transformer (80 trans) to recharge the inner battery or direct to offer the circuit without go through build-into battery, or (b) outside solar module power into built-in battery, or (c) outside generator, wind power into built-in battery, or (d) outside transformer supply AC-to-DC current one part DC current get into built-in battery for rechargeable, one part DC current to supply to the USB or other DC required circuit, and one part DC current to supply to the illumination if had other light source existing.

The said DC type hold-base also has USB port, Outlet receiving socket, adaptors Receiving ends so can get all kind of outside power source or supply desired power to other outside electric device.

From FIG. 8A is same as FIG. 8. The DC type hold-base also has the preferred two contact piece to make electric contact with the said 2 conductive-piece of the said projection light. The said two contact piece may use (a) built-in by tool design for compartment for magnetic-piece installation or (b) added-on for universal magnetic sealed-units by attachment or installation or assembly procedure to add on the said hold-base in desired height and locations so can match the two conductive piece on the said Projection light not only for 100% attach the projection light into hold-base without fall apart by magnetic force but also can had electric signal or current delivery to the said projection light.

The current invention as above discussion and has other below listed 25 points for the features to improve big than inductive charger device:

1. A LED projection light has multiple functions consist of;
    At least one project assembly install on the projection light to project image and/or lighted patterns to wall, ceiling, surface feet away.
    The said project LED light has extend-and-retractable or movable magnify-lens for projection image in order to get focus adjust for clear image or lighted patterns on different distance surface from Projection light.
    The said project LED light is DC current product and has built-in rechargeable battery which can be charged by;
    (a) LED projection light itself has built-in prong to insert into AC outlet, or
    (b) LED projection light is fit into a hold-base which has prong to insert AC outlet, or
    (c) LED projection light has hold-base has receiving-ends to receive outside AC-to-DC transformer or built-in AC-to-DC circuitry output end DC power, or output end DC, or
    (d) LED projection light has built-in DC power source and through circuit to get desired DC current for projection light or others functions operation
    While projection light has prong to plug-into AC outlet and go through AC-to-DC and/or DC-to-DC circuitry and/or conductive piece to get power for said LEDs or COB (Chip-on-board) to turn on and turn-off basing on pre-determined functions, brightness, color, color changing functions or market available light performance.
    The said project LED light has (1) top or head lens and (2) the lens for magnify image and/or lighted patterns which (aa) install or (bb) fit or (cc) built-in by injection process on center area of top or head lens by sealing or join-kits or injection-process including rubber ring, or sonic-sealing, or solvent, or press-tight, or physical fitting or injection-out by pre-design combine both magnify-lens and top-lens in one piece.
    The said project LED light has desired number of LED(s) or LED Chip(s) or SMD LEDs or COB-LED(s) surrounding the center of the project assembly parts and accessories so can has (a) project image functions and (b) flashlight and/or power failure light functions from one of the head of LED projection light device.
2. A LED projection light has multiple functions,
    the said multiple functions including at one of projection light and at least one of select other LED related light from group combination including (1) power fail light and/or (2) night light and/or (3) Flashlight and/or (4) glow light and/or (5) multiple functions LED light and/or (6) motion and/or moving and/or photo sensor(s) light and/or (7) bug repelled light (8) air-freshener light and/or (9) time piece light and/or (10) light has built-in Wi-Fi or APP or other software related items and/or (11) light has built-in USB related items and/or (12) light has built-in remote or wireless or blue-tooth signal receiver and/or transmitter kits or system and/or (13) light has built-in outlet or USB-ports or receiving ends and/or (14) light has built-in surge, over-heat, over-charge protection circuit or circuitry and/or (15)

3. A LED projection light has multiple functions,
the said multiple functions including at one of projection light and at least one of select other LED related light from group combination including (1) power fail light and/or (2) night light and/or (3) Flashlight and/or (4) glow light and/or (5) multiple functions LED light and/or (6) motion and/or moving and/or photo sensor(s) light and/or (7) bug repelled light (8) air-freshener light and/or (9) time piece light and/or (10) light has built-in Wi-Fi or APP or other software related items and/or (11) light has built-in USB related items and/or (12) light has built-in remote or wireless or blue-tooth signal receiver and/or transmitter kits or system and/or (13) light has built-in outlet or USB-ports or receiving ends and/or (14) light has built-in surge, over-heat, over-charge protection circuit or circuitry and/or (15)

4. A LED projection light has multiple functions, the said LED projection light has 2 conductive rings or area(s) or desired locations including hi-low arrangement on the body which contact with 2 contact piece on the said hold-base on relatively locations for the 2 rings or area(s) to contacted and to charge the LED projection light's inner rechargeable battery or energy storage unit(s).

5. A LED projection light has multiple functions, the said 2 contact piece(s) on the hold-base which is movable magnetic-units which can pop-out while the 2 conductive rings or area(s) fall within the magnetic force range to (1) make contact to fit into location and (2) delivery electric signal or current.

6. A LED projection light has multiple functions, the said housing or head of the LED light has project assembly and enlarge-lens which can extend-and-retract or move to change the distance between (aa) the said enlarge-lens and (bb) the image forming film, or slide, or displayer, or screen, or image-forming unit to adjust focus.

7. A LED projection light has multiple functions, the said project assembly including (a) at least one of image enlarge-lens on top or front-side, (b) at least one of LED on bottom or back-side, (c) at least one of slide or film or display forming unit within the top-bottom or one side-other side, (d) at least one of tube or housing to keep majority of the light beam is traveling the tube or housing to prevent leakage out.

8. A LED projection light has multiple functions, the said tube or housing has more than one piece and at least has one inner and outer tube or housing so can use extend-retract or screw-thread to put the inner or smaller width, diameter, cross-section area piece into bigger width, diameter, cross-section area to make distance change for magnify-lens and image forming-unit.

9. A LED projection light has multiple functions, the said LED projection light for hold-base application the said 2 conductive pieces are 2 rings on high-and-low position so can make electric contact with 2 electric carry contact piece on the hold-base.

10. A LED projection light has multiple functions, the said 2 electric carry contact piece are (a) built-in magnetic units or (b) add-on universal magnetic sealed-unit, both can make (aa) magnetic fit the LED projection light easily and (bb) get electric signal or current delivery from hold-base to LED projection light.

11. A LED projection light has multiple functions, the said LED projection light has built-in prongs to plug into outlet which is foldable or non-foldable prongs.

12. A LED projection light has multiple functions, the said the LED projection light has hold-base has multiple receiving-end(s) including (AA) outlet(s), and/or (BB) USB ports(s) for type A or Type C or Android-ports, to make the AC and/or DC current delivery to supply and/or to charge the inner rechargeable battery or energy storage unit(s).

13. A LED projection light has multiple functions, the said the LED projection light has incorporated hold-base has multiple receiving-end(s) which has receiving socket or hole or female receptacle(s) to receiving outside (1) transformer, and/or (2) generator, (3) solar module, (4) chemical power generator power into the LED projection light while the hold-base has no prongs and operated by the DC power source has battery or energy storage unit(s) inside so can get continuously power from outside device(s).

14. A LED projection light has multiple functions, the said LED projection light has incorporated hold-base operated by DC power source which from (A) transformer and/or (B) built-in battery which be charged by AC-to-DC circuit or by solar module or by chemical power or by generator power.

15. A LED projection light has multiple functions, the said LED projection light magnify lens has center project magnify lens and tube assembly which can replace by camera lens with camera accessories to make the photos or digital video.

16. A multiple functions LED projection light consist of;
LED projection light is hand-carry item and supply illumination by LED(s) which operated by Direct current (DC).
At least one of project assembly fit into the projection light including;
(1) a refractive or magnify lens (a) fit or assembled or (b) built-in by injection process on center the projection light front lens, and
(2) a lower positioned outer-tube(s) assembled together with top or front project lens to envelope or surrounding or wrap around the below separated inner-tube in order to prevent light beam leakage out, and
(3) at least one of LED and/or SMD-LEDs and/or chip LEDs and/or COB (Chips-on-board) surrounding the said center project assembly to emit desired brightness through the light front lens for illumination beside the center projection light.
The said Projection light at least has (a) project image and/or lighted pattern function and (b) light beam emit out from areas that surrounding the center project assembly.

17. A LED projection light has multiple functions, the said projection light has built-in rechargeable battery which be charged by
(1) Projection light unit has built-in prong-set and AC-to-DC or other circuit t, or
(2) Projection light has separated hold-base which has prong-sets which has contact piece(s) to delivery electric current to projection light's conductive-piece(s) and through circuit to charge the built-in battery, or
(3) Projection light has separated hold-base with adaptor or USB port(s) to receive male plug with wire from the outside transformer, solar module, chemical power, generator power, wind power, USB power bank, or other DC output power source and circuit to charge or storage other power source DC current into battery.

18. A LED projection light has multiple function, the said multiple functions light has preferred more than 2 type of light which may selected from group combination from (1) projection light, (2) power fail light, (3) Night light, (4) Glow Body light, (5) Flashlight, (6) light has built-in camera, (7) light has built-in USB ports, (8) Light has built-in Outlet(s), (9) light has built-in adaptor or receiving port or socket to connect with outside transformer, solar power, wind power or chemical power source to get power save into the inner rechargeable battery.

19. A LED projection light has multiple function, the said multiple lights are control by circuit and electric parts and accessories or software for desired group combination select from (1) sensor, (2) switch, (3) IC, (4) wired or wireless system, (6) Wi-Fi communication, (7) APP software, (8) electric related components and/or accessories.

20. A LED projection light has multiple functions, the said projection light has separated hold-base which has prongs to plug-into outlet to get the AC power and through contact and conductive piece(s) to deliver to the projection light and go through the AC-to-DC circuit to get DC power for projection light DC operated device to use.

21. A LED projection light has multiple functions, the said hold-base has tilt angle or angle adjustable construction.

22. A LED projection light has multiple functions, the said projection light which has COB-LED(s) for the flashlight illumination which is a donut-shape and center-area is empty to install the project outer tube and parts.

23. A LED projection light has multiple functions, the said projection light has built-in prongs so can plug into outlet and through the inner AC-to-DC circuit to get DC power for LED or DC operated device.

24. A LED projection light has multiple functions, the said hold-base has (a) built-in contact-pieces or (b) built-in magnetic pieces or (c) added-on universal magnetic sealed-unit(s) to contact with the said projection light housing conductive piece(s) to delivery current to recharge the projection light inner battery.

25. A LED projection light has multiple functions, the said magnetic piece for (1) built-in or (2) added-on is a movable piece while metal piece is located within the magnetic-force range the magnetic-piece will pop-out and attached on metal piece. While the metal piece location away from or falls out of magnetic-force range, the magnetic piece will move back to its original position and back to inside of the projection light's housing or sealed-unit housing.

It is appreciated all above listed or discussed of all patent and/or co-pending filed cases all text, drawing, figure, spirit, concept should also fall within this child filing cases coverage, claims, scope.

The invention claimed is:

1. A multiple function LED projection light, comprising:
at least one projection assembly installed on the multiple function LED projection light to project at least one of an image or pattern on an indoor or outdoor surface that is spaced from the LED projection light by multiple feet; and
a plurality of LEDs, wherein:
the multiple function LED projection light has a movable magnifying projection lens for focusing the projected image or pattern,
the multiple function LED projection light is a DC current operated product and has a built-in energy storage unit for providing power when no AC power is available, the built-in energy storage unit including at least one of (a) a rechargeable battery charged by AC current from prongs inserted into an AC outlet, a holder having prongs inserted into an AC outlet or that is supplied with DC power from an external transformer, or an internal AC to DC circuit that supplies DC power to the rechargeable battery; and (b) a DC power source,
the multiple function LED projection light includes circuitry for causing the at least one LED to turn on and off and provide at least one of a predetermined light performance, brightness, color, and color changing function,
the projection assembly is installed at a center of a front area of the multiple function LED projection light by injection molding, sonic sealing, adhesives, or press fitting, said projection assembly including the movable magnifying projection lens and an additional front lens,
at least one of the plurality of LEDs is positioned in a space surrounding the center of the front area of the LED projection light to serve as a flashlight or power fail light, and
at least one other of the plurality of LEDs is installed in a front, side, or bottom of the multiple function LED projection light to serve as a projection light source.

2. The multiple function LED projection light as claimed in claim 1, wherein the multiple functions include a projection function and at least one additional function selected from (1) a power fail light, (2) a night light, (3) a flashlight, (4) a glow light, (5) an LED light with multiple non-illumination functions, (6) a motion or photo sensor activated light, (7) a bug repelling light, (8) an air-freshener light, (9) a time piece light, (10) a light having built-in WIFI or software, (11) a light having built-in USB connector, (12) a light having a built-in wireless communications, (13) a light having built-in outlet or USB-port, (14) a light having built-in surge, over-heating, or over-charge protection circuit or circuitry, and (15) a non-projecting illumination function.

3. The multiple function LED projection light as claimed in claim 2, wherein the LED projection light has more than one said additional function selected from (1) a power fail light, (2) a night light, (3) a flashlight, (4) a glow light, (5) an LED light with multiple non-illumination functions, (6) a motion or photo sensor activated light, (7) a bug repelling light, (8) an air-freshener light, (9) a time piece light, (10) a light having built-in WiFi or software, (11) a light having built-in USB connector, (12) a light having a built-in wireless communications, (13) a light having built-in outlet or USB-port, (14) a light having built-in surge, over-heating, or over-charge protection circuit or circuitry, and (15) an LED light without a projection function.

4. The multiple function LED projection light as claimed in claim 1, wherein said holder includes a holder base, and wherein the multiple function LED projection light includes a main body having two conductive pieces that contact corresponding conductive areas on the holder base to conduct electricity to charge said rechargeable battery.

5. The multiple function LED projection light as claimed in claim 4, further comprising magnetic-units in the holder base to hold the main body while the rechargeable battery is being charged.

6. The multiple function LED projection light as claimed in claim 1, wherein the at least one projection assembly and built-in magnifying lens is extendable and retractable to change a distance between the magnifying lens and an image forming film, slide, display, screen, or image-forming unit and thereby adjust the focus.

7. The multiple function LED projection light as claimed in claim 1, wherein the at least one projection assembly includes the at least one magnifying lens on a top or front side, at least one said LED on a bottom or back side, at least one slide, film or display unit between the at least one said LED and the magnifying lens, and (d) at least one of a tube, tray-assembly, or elongate housing to prevent leakage of light traveling between the at least one said LED and the magnifying lens.

8. The multiple function LED projection light as claimed in claim 7, wherein the at least one of a tube, tray-assembly, or elongate housing includes two relatively retractable and extendable pieces to move the magnifying lens relative to the at least one slide, film or display unit and thereby change or adjust the focus of the projected image or pattern.

9. The multiple function LED projection light as claimed in claim 1, wherein said holder having prongs inserted into an AC outlet or said holder supplied with DC power from an external transformer includes a holder base, and wherein the multiple function LED projection light includes a main body having two conductive pieces that contact corresponding conductive areas on the holder base to conduct electricity for multiple functions.

10. The multiple function LED projection light as claimed in claim 9, wherein the two conductive pieces include built-in magnetic units or an add-on universal magnetic sealed-unit to both hold a main body of the multiple function LED projection light in said holder and conduct electricity between the holder and the main body.

11. The multiple function LED projection light as claimed in claim 1, wherein the multiple function LED projection light has built-in foldable or non-foldable prongs to plug into an outlet.

12. The multiple function LED projection light as claimed in claim 1, wherein the holder has a holder base having at least one power outlet or charging port through which power is supplied to the rechargeable battery.

13. The multiple function LED projection light as claimed in claim 1, wherein the holder has a holder base with at least one female receptacle for receiving a plug-in external transformer, generator, solar module, or chemical power generating module to supply power through the holder to the rechargeable battery.

14. The multiple function LED projection light as claimed in claim 1, wherein the holder has a holder base with at least one female receptacle for receiving a plug-in external transformer, generator, solar module, or chemical power generating module to supply power through the holder to the rechargeable battery for powering the multiple function LED projection light when prongs of the multiple function LED projection light are not supplied with power from an AC outlet.

15. The multiple function LED projection light as claimed in claim 1, wherein the multiple function LED projection light is supplied with power through the holder to the rechargeable battery for powering the LED projection light when prongs of the LED projection light are not supplied with power from an AC outlet.

16. The multiple function LED projection light as claimed in claim 1, wherein the multiple function LED projection light has a built-in holder base supplied with power from an external transformer, AC-to-DC circuit, solar module, chemical power, or generator.

17. The multiple function LED projection light as claimed in claim 1, wherein the magnifying lens and a tube assembly are removable and replaceable by a camera assembly having a camera lens with camera accessories to take photos or digital video.

18. A multiple function hand-carried DC LED projection light, comprising:
at least one projection assembly that fits into the hand-carried DC LED projection light, the projection assembly including an inner tube and a refractive or magnifying lens fitted or injected molded into a front center of the projection assembly;
an outer tube assembled together with a front lens, wherein the inner tube positioned within the outer tube to transmit light from a projection light source without light leakage; and
LEDs surrounding the projection assembly to emit light having a desired brightness through the front lens for illumination, wherein:
the at least one projection assembly is arranged to project an image or pattern and the LEDs surrounding the projection assembly are arranged to emit light from areas that surround the projection assembly to provide a flashlight function that is in addition to the image or pattern projection function of the projection assembly, and
the LED projection light has at least one added function selected from a power fail function, a motion/photo/radar sensor function, a charging function to charge other products by a built-in USB charging-port, a function of receiving wireless RF, IR, or WiFi or Bluetooth signals, and a control function of providing predetermined light effects including setting, mixing, selection, and adjustment of LED color, brightness, and turn on.

19. The multiple function hand-carried DC LED projection light as claimed in claim 18, the said project light has built-in rechargeable battery charged by AC current from prongs inserted into an AC outlet, a holder having prongs inserted into an AC outlet or that is supplied with DC power from an external transformer, or an internal AC to DC circuit that supplies DC power to the rechargeable battery.

20. The multiple function hand-carried DC LED projection light as claimed in claim 18, wherein the LED projection light further has functions of a night light, glow light, light with a built-in camera, light with USB ports, light with power outlets, and light having a built-in adaptor, receiving port or socket to connect with an outside transformer, solar power, wind power or chemical power source to store power in an inner rechargeable battery.

21. The multiple function hand-carried DC LED projection light as claimed in claim 18, wherein the flashlight and projection light functions are controlled by circuitry and components selected from a:
(1) sensor,
(2) switch,
(3) IC,
(4) wired or wireless system,
(5) IR or RF or Blue-tooth wireless transceiver,
(6) WiFi communication components, and
(7) a processor and APP software.

22. The multiple function hand-carried DC LED projection light as claimed in claim 18, further comprising a separate holder base with prongs to plug into an outlet and an AC-to-DC circuit or AC-to-DC and DC-to-DC circuits for providing DC power to the LED projection light.

23. The multiple function hand-carried DC LED projection light as claimed in claim 22, wherein a tilt angle of the holder base is adjustable.

24. The multiple function DC LED projection light as claimed in claim 22, wherein said holder base has conductive pieces that contact corresponding conductive areas on the LED projection light to conduct electricity for multiple functions.

25. The multiple function LED projection light as claimed in claim 24, wherein the conductive pieces include built-in magnetic units or an add-on universal magnetic sealed-unit to both hold a main body of the LED projection light in said holder base and conduct electricity between the holder base and the LED projection light.

\* \* \* \* \*